(12) United States Patent
Yang et al.

(10) Patent No.: US 12,318,644 B2
(45) Date of Patent: Jun. 3, 2025

(54) WATER INJECTION UNIT AND ENERGY STORAGE SYSTEM INCLUDING THE SAME

(71) Applicant: LG ENERGY SOLUTION, LTD., Seoul (KR)

(72) Inventors: Mun-Seok Yang, Daejeon (KR); Ji-Hun Kim, Daejeon (KR); Hong-Jae Park, Daejeon (KR); Yo-Hwan Kim, Daejeon (KR); Sung-Han Yoon, Daejeon (KR); Ji-Won Lee, Daejeon (KR); Hyun-Min Lee, Daejeon (KR); Hyung-Uk Lee, Daejeon (KR); Seung-Jun Lee, Daejeon (KR); Tae-Shin Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/755,427

(22) Filed: Jun. 26, 2024

(65) Prior Publication Data

US 2024/0342526 A1 Oct. 17, 2024

Related U.S. Application Data

(63) Continuation of application No. PCT/KR2023/000971, filed on Jan. 19, 2023.

(30) Foreign Application Priority Data

Jan. 19, 2022 (KR) .................... 10-2022-0008104
Jan. 17, 2023 (KR) .................... 10-2023-0006974

(51) Int. Cl.
*H01M 10/613* (2014.01)
*A62C 3/16* (2006.01)
(Continued)

(52) U.S. Cl.
CPC .............. *A62C 35/023* (2013.01); *A62C 3/16* (2013.01); *A62C 35/13* (2013.01);
(Continued)

(58) Field of Classification Search
CPC ...................... H01M 10/63; H01M 10/106568
See application file for complete search history.

(56) References Cited

U.S. PATENT DOCUMENTS

2013/0206910 A1\* 8/2013 Stolte ................. A62C 99/0018
244/129.2
2019/0046820 A1 2/2019 Lee et al.
2020/0353406 A1\* 11/2020 Philipp .................. A62C 37/44

FOREIGN PATENT DOCUMENTS

DE 10 2013 002 853 A1 8/2014
JP 52-51794 A 4/1977
(Continued)

OTHER PUBLICATIONS

International Search Report for PCT/KR2023/000971 (PCT/ISA/210) mailed on May 18, 2023.
(Continued)

*Primary Examiner* — Olatunji A Godo
(74) *Attorney, Agent, or Firm* — Birch, Stewart, Kolasch & Birch, LLP

(57) ABSTRACT

A water injection unit includes an enclosure including, on at least one outer wall, a connection port connectable to a fire-fighting connection hose or a communication cable, a water tank connected to the connection port and located in the enclosure, a gas storage tank connected to the water tank to supply gas into the water tank, and a controller connected to the connection port and the gas storage tank, and configured to detect whether a fire occurs in the battery container, and allow gas in the gas storage tank to be sprayed into the
(Continued)

water tank and allow fire extinguishing water in the water tank to be discharged due to gas pressure.

18 Claims, 18 Drawing Sheets

(51) Int. Cl.
    *A62C 35/02*       (2006.01)
    *A62C 35/13*       (2006.01)
    *H01M 10/63*       (2014.01)
    *H01M 10/6568*   (2014.01)

(52) U.S. Cl.
    CPC ......... *H01M 10/613* (2015.04); *H01M 10/63* (2015.04); *H01M 10/6568* (2015.04); *H01M 2200/10* (2013.01)

(56) References Cited

FOREIGN PATENT DOCUMENTS

| | | |
|---|---|---|
| JP | 61-213067 A | 9/1986 |
| JP | 5-89908 A | 4/1993 |
| JP | 9-239058 A | 9/1997 |
| JP | 11-108218 A | 4/1999 |
| JP | 2008-30787 A | 2/2008 |
| JP | 2017-4959 A | 1/2017 |
| JP | 2017-30847 A | 2/2017 |
| JP | 3208685 U | 2/2017 |
| KR | 10-2008-0060703 A | 7/2008 |
| KR | 10-0880023 B1 | 2/2009 |
| KR | 10-2016-0126490 A | 11/2016 |
| KR | 10-1904194 B1 | 10/2018 |
| KR | 10-2053988 B1 | 12/2019 |
| KR | 10-2106153 B1 | 5/2020 |
| KR | 10-2154314 B1 | 9/2020 |
| KR | 10-2178601 B1 | 11/2020 |
| KR | 10-2021-0014402 A | 2/2021 |
| KR | 10-2021-0104492 A | 8/2021 |
| WO | WO2021/111409 A2 | 6/2021 |

OTHER PUBLICATIONS

Extended European Search Report for European Application No. 23743503.7, dated Oct. 21, 2024.

\* cited by examiner

WATER INJECTION UNIT AND ENERGY STORAGE SYSTEM INCLUDING THE SAME

CROSS REFERENCE TO RELATED APPLICATIONS

The present application is a continuation of PCT/KR2023/000971, filed Jan. 19, 2023, and claims priority to Korean Patent Application Nos. 10-2022-0008104 and 10-2023-0006974, filed on Jan. 19, 2022, and Jan. 17, 2023, respectively, in the Republic of Korea, the disclosures of which are incorporated herein by reference.

TECHNICAL FIELD

The present disclosure relates to a water injection unit and an energy storage system including the same, and more particularly, to a water injection unit capable of supplying fire extinguishing water to a plurality of energy storage containers, and an energy storage system including the water injection unit.

BACKGROUND

In the field of power infrastructure, the concept of a smart grid has emerged as the future of power distribution. A smart grid aims to optimize operational efficiency by enabling seamless two-way communication between power suppliers and consumers, facilitating real-time monitoring and control of the grid through the integration of information and communication technology into existing power systems. This transition towards a smart grid is particularly pertinent in light of the recent proliferation of newer power technologies, such as electric vehicle charging systems and renewable energy sources. Real-time consumer power usage information provided by the smart grid can significantly enhance power utilization efficiency, ultimately reducing the need for excessive investments in power generation facilities and mitigating greenhouse gas emissions and other climate impacts. Consequently, smart grids have garnered heightened interest, spurred by the desire to modernize power grids and expand renewable energy sources, prompting robust research and development efforts in this field.

A key technology within the realm of smart grids revolves around the innovation of energy storage devices. These devices accumulate surplus power during off-peak periods and judiciously dispense stored electric energy during peak demand, thereby fostering load leveling and promoting the optimal use of power infrastructure.

Historically, energy storage predominantly relied on methods such as pumped-storage power generation, which converts nighttime surplus power into potential energy stored in water, or the use of chemical energy storage through the parallel or series configuration of lead-acid batteries. However, recent advancements in high-energy-density lithium-ion batteries have revolutionized the landscape, making it feasible to construct high-voltage, high-capacity energy storage systems using chemical energy storage methods.

One of the most pressing social concerns associated with energy storage devices pertains to fire safety. Given the extensive incorporation of numerous batteries in energy storage devices, there can exist a substantial risk of chain reactions and fire propagation in the event of a failure involving a single battery.

Contemporary energy storage systems often include a large number of battery containers to meet large charge and discharge capacity requirements. Within each battery container, multiple battery racks may be employed, each of which may house a plurality of battery modules.

Consequently, ensuring the fire safety of these energy storage systems necessitates the deployment of an efficient fluid injection system capable of swiftly and effectively performing fluid injections and fire suppression functions for the numerous batteries encompassed within such energy storage systems.

DISCLOSURE

Technical Problem

The present disclosure is designed to solve the problems of the related art, and therefore the present disclosure is directed to providing a water injection unit capable of effective water injection to battery containers and having excellent installation convenience, and an energy storage system including the water injection unit.

However, technical objectives to be achieved by the present disclosure are not limited thereto, and other unmentioned technical objectives will be apparent to one of ordinary skill in the art from the description of the present disclosure.

Technical Solution

In one aspect of the present disclosure, there is provided a water injection unit including an enclosure including a first side wall having a connection port connectable to a fire-fighting connection hose, a water tank connected to the connection port and located in the enclosure, a gas storage tank connected to the water tank to supply gas into the water tank, and a controller connected to the connection port and the gas storage tank, and configured to detect whether a fire occurs in a battery container, and cause gas in the gas storage tank to enter into the water tank and allow a fire extinguishing agent in the water tank to be discharged due to gas pressure. The enclosure may include an enclosure body forming a side portion and a ceiling portion, and a base frame assembly located under the enclosure body and supporting the enclosure body, and configured to be transportable by an industrial truck.

The gas storage tank may contain nitrogen.

The enclosure may further include an external water source port provided on an outer wall configured to be connectable to an external water source, and the pipe member may further include an external water source connection line for connecting the external water source port to the water injection pipe line.

The water injection unit may further include a pipe member provided in the enclosure, wherein the pipe member includes a water injection pipe line for connecting the water tank to the injection port, a drain/fill pipe line for connecting the water tank to the drain/fill port, and a communication conduit line for connecting the controller to the communication port.

The enclosure may further include an external water source port provided on an outer wall to be connectable to an external water source (e.g., a fire hydrant or a fire engine), and the pipe member may further include an external water source connection line for connecting the external water source port to the water injection pipe line.

The water injection unit may further include an air conditioning device fixedly provided on an outer wall of the enclosure to adjust a temperature and humidity in the enclosure.

The water injection unit may further include a manual operation unit provided on an outer wall of the enclosure and connected to the gas storage tank to release gas stored in the gas storage tank.

The water injection unit may further include a horn or a warning light provided on an outer wall of the enclosure, connected to the controller, and configured to emit an alarm sound or light in an event situation.

The base frame assembly may include an outer frame forming a quadrangular edge with four beams, and a bottom panel portion covering an inner area of the quadrangular edge of the outer frame, wherein the outer frame includes insertion holes in two beams that are parallel to each other.

The base frame assembly may include an outer frame forming a quadrangular edge with four beams extending in a first direction, a bottom panel portion covering an inner empty area of the outer frame, and anchors inserted into each of the four beams, and configured to change positions along an extending direction of the beams.

Each of at least two of the four beams may include an anchor insertion portion formed by a recessed side surface, wherein each anchor is inserted into the anchor insertion portion, and includes a beam support plate including a first part having a height corresponding to a height of an inner space of the anchor insertion portion and having an interference fit with the anchor insertion portion, and a second part protruding outward from the anchor insertion portion, and an anchor plate provided at a lower end of the second part.

In another aspect of the present disclosure, there is provided an energy storage system including the water injection unit and a plurality of battery containers, each battery container including a battery rack, a fire detector, and a fire-fighting pipe line, wherein the water injection unit and the plurality of battery containers are connected by a fire-fighting connection hose.

The battery container may further include a fire-fighting connector provided on an outer wall surface and connected to the fire-fighting pipe line, wherein the fire-fighting connector of a first battery container of the plurality of battery containers and the fire-fighting connector of a second battery container of the plurality of battery containers are connected by the fire-fighting connection hose.

The fire-fighting connector may include a first fire-fighting connector provided on the first battery container, and a second fire-fighting connector provided on the first battery container, wherein the fire-fighting pipe line includes a main pipe having a first end connected to the first fire-fighting connector and a second end connected to the second fire-fighting connector, a plurality of branch pipes branching from the main pipe, and a rack pipe connected to each of the plurality of branch pipes and fixedly provided on the battery rack, wherein the rack pipe includes injection nozzles respectively connected to battery modules provided in the battery rack.

Each of at least two of the four beams comprises a U-shaped channel, and each anchor is inserted into the U-shaped channel and can be fixed at any point along the U-shaped channel.

Each anchor has a beam support plate comprising a first part having a height corresponding to a height of the U-shaped channel, a second part protruding outward from the U-shaped channel and an anchor plate provided at a lower end of the second part.

In another aspect of the present disclosure, there is provided a water injection unit including an enclosure including an enclosure body forming a side portion and a ceiling portion, a first side wall having a connection port connectable to a fire-fighting connection hose and a base frame assembly located under the enclosure body and supporting the enclosure body, a water tank connected to the connection port and located in the enclosure, a nitrogen storage tank connected to the water tank to supply nitrogen gas into the water tank; and a controller connected to the connection port and the nitrogen storage tank, and configured to detect whether a fire occurs in a battery container, cause nitrogen gas in the nitrogen storage tank to enter into the water tank, and allow a fire extinguishing agent in the water tank to be discharged due to nitrogen gas pressure.

The connection port is provided at a lower end of the first side wall of the enclosure, the connection port including an injection port connected to the fire-fighting connection hose configured to be connected to the battery container, a drain/fill port for filling or draining the fire extinguishing agent in or from the water tank and a communication port for connecting a communication cable to the controller.

The water injection unit may have a pipe member provided in the enclosure, wherein the pipe member may include a water injection pipe line for connecting the water tank to the injection port, a drain/fill pipe line for connecting the water tank to the drain/fill port; and a communication conduit line for connecting the controller to the communication port.

Advantageous Effects

According to an aspect of the present disclosure, there may be provided a water injection unit capable of effective water injection to a plurality of battery containers and having excellent installation convenience, and an energy storage system including the water injection unit.

In particular, because the water injection unit according to the present disclosure is capable of fire determination, warning, and rapid water injection to a plurality of battery containers, early fire suppression may be achieved and the spread of a fire may be prevented. Also, because the water injection unit according to the present disclosure has excellent transportation and installation convenience, human and material costs required to build on-site facilities may be reduced.

The effects of the present disclosure are not limited to the effects mentioned above, and other effects not mentioned will be clearly understood by one of ordinary skill in the art from the detailed description of the present disclosure.

BEST MODE

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In the case in which one part is said to be connected to another part throughout the specification, not only may the one part be directly connected to the other part, but also, the one part may be indirectly connected to the other part via a further part. In addition, when a part "includes" a certain element, the part may further include another element instead of excluding the other element, unless otherwise stated.

Now, preferred embodiments of the present disclosure will be described in detail with reference to the accompanying drawings such that the preferred embodiments of the present disclosure may be easily implemented by one of ordinary skill in the art to which the present disclosure pertains. While describing the preferred embodiments of the present disclosure, descriptions of related well-known technology or configurations that may blur the points of the present disclosure are omitted.

A water injection unit described below is fire-fighting equipment for preferably outdoor installation and is fire-fighting equipment for ensuring fire safety of an energy storage system. However, the water injection unit according to the present disclosure is not necessarily an item that should be used restrictively to construct an energy storage system. That is, the water injection unit may be used as fire-fighting equipment for a general building or a warehouse, as well as an energy storage system.

Figure 1:
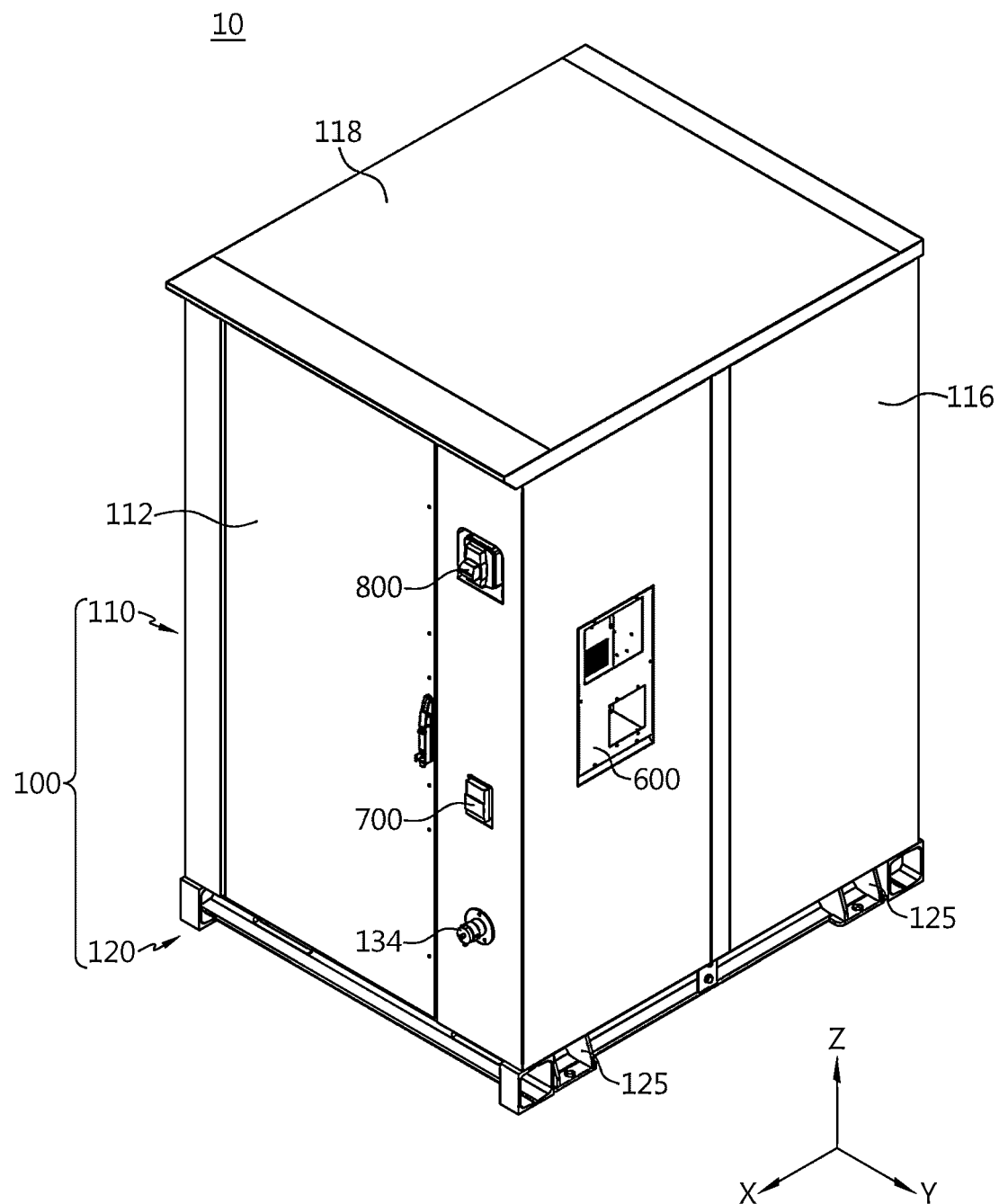
FIG. 1 is a schematic perspective view illustrating a water injection unit, according to an embodiment of the present disclosure.
Figure 2:
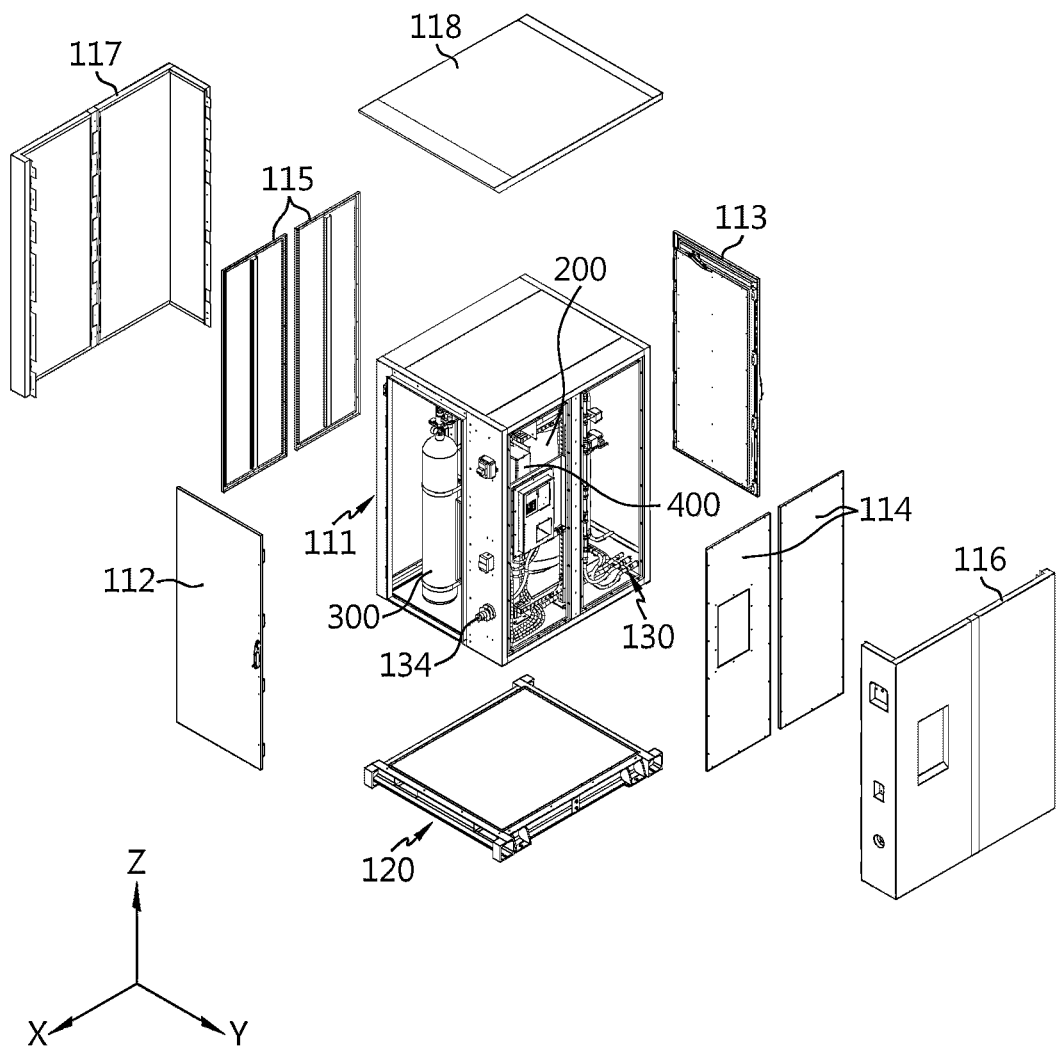
FIG. 2 is a partial exploded perspective view illustrating the water injection unit of FIG. 1.

FIG. 1 is a schematic perspective view illustrating a water injection unit, according to an embodiment of the present disclosure. FIG. 2 is a partial exploded perspective view illustrating the water injection unit of FIG. 1.

Referring to FIGS. 1 and 2, a water injection unit 10 according to an embodiment of the present disclosure includes an enclosure 100 including, on at least one outer wall, a connection port 130 connectable to a fire-fighting connection hose or a communication cable connected from a battery container 20, a water tank 200 in which a certain amount of fire extinguishing water is stored, a gas storage tank 300 in which gas is stored, and a controller 400.

Figure 19:
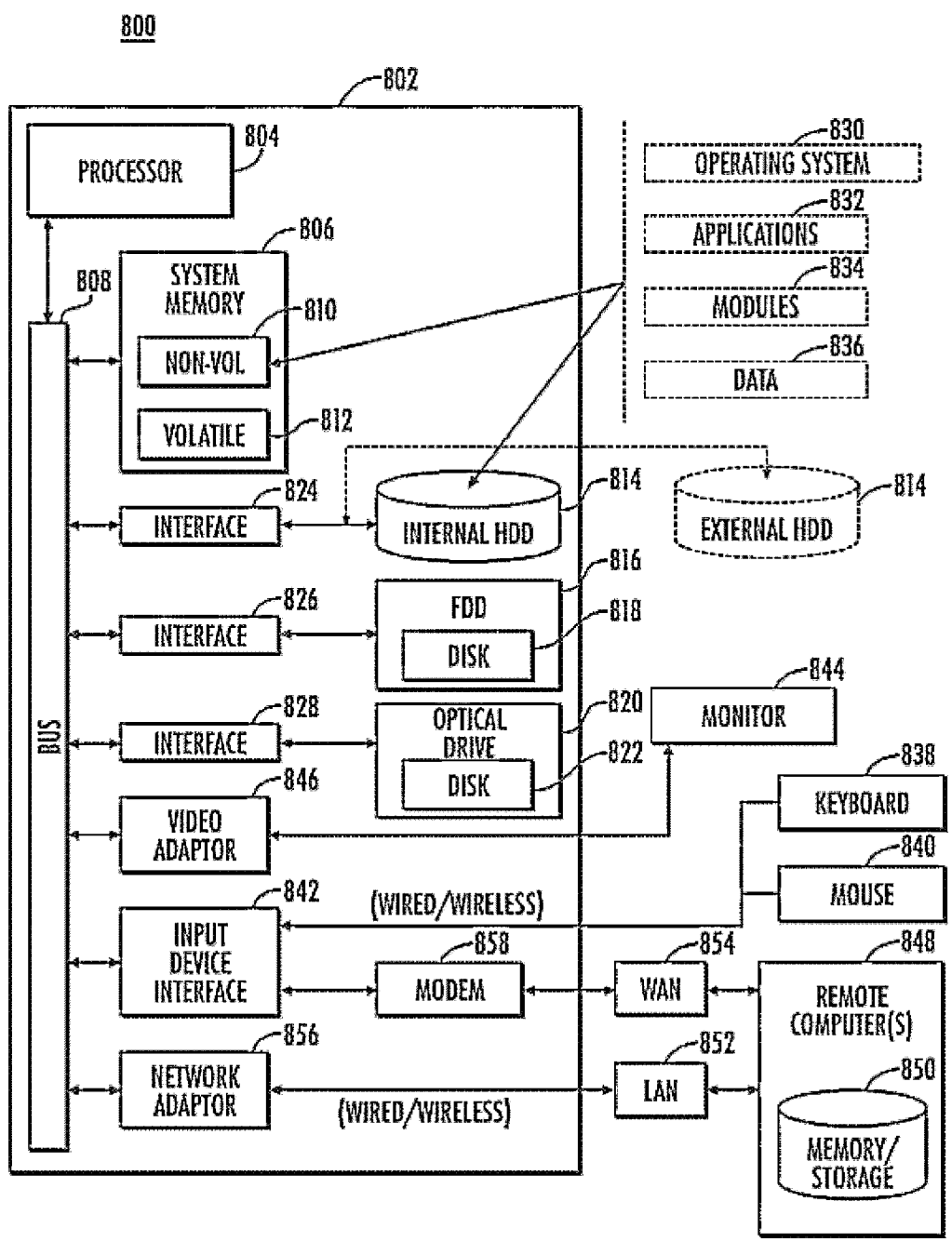
FIG. 19 is a diagram schematically illustrating a controller.

As shown in FIG. 19, controller 400 includes a system 802 having a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 19, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by an HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-readable instructions, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the battery systems 200.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. A network is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

As described below in detail, because the water tank 200, the gas storage tank 300, the controller 400, and other pipe members are accommodated in the enclosure 100 and the enclosure 100 includes the connection port 130 on a side wall, the water injection unit 10 may be easily transported to a desired installation location and may be simply and easily connected to the battery container 20.

Also, because the water injection unit 10 according to the present disclosure is configured to determine whether there is a fire in the battery container 20 by communicating with the battery container 20 and supply fire extinguishing water to the battery container 20 when a fire is detected, early fire suppression of the battery container 20 may be achieved and the spread of the fire may be prevented.

As a main element of the water injection unit 10, the enclosure 100 may protect components such as the water tank 200, the gas storage tank 300, and the controller 400 from the outside, and may be configured to be easily transported and installed outdoors.

The enclosure 100 may be implemented in the form of a box that is easy to transport and has an inner space in which the water tank 200, the gas storage tank 300, the controller 400, and other pipe members may be accommodated. In detail, as shown in FIG. 1, the enclosure 100 includes an enclosure body 110 forming a side portion and a ceiling portion, and a base frame assembly 120 located under the enclosure body 110 and supporting the enclosure body 110. The side portion refers to a portion surrounding front, rear, left, and right sides of the enclosure 100 excluding upper and lower sides of the enclosure 100, and the ceiling portion refers to a portion covering the upper side of the enclosure 100.

The enclosure body 110 includes an inner frame 111, a front door 112, a rear door 113, a first inner cover 114, a second inner cover 115, a first side panel assembly 116, a second side panel assembly 117, and a top cover 118, as shown in FIG. 2.

The inner frame 111 has a substantially rectangular parallelepiped structure by combining various angles and panels. Also, the inner frame 111 may include one or more bars that are vertically or horizontally provided therein. The water tank 200, the gas storage tank 300, the controller 400, and other pipe members may be fixed to the bars by using fixing means such as a bracket.

Open portions of the inner frame 111 of FIG. 2 may be covered by the front door 112, the rear door 113, the first inner cover 114, the second inner cover 115, the first side panel assembly 116, and the second side panel assembly 117 as shown in FIG. 1.

The front door 112, the rear door 113, the first inner cover 114, the second inner cover 115, the first side panel assembly 116, the second side panel assembly 117, and the top cover 118 may each include an insulator and thus have insulation and dustproof performance.

Figure 3:
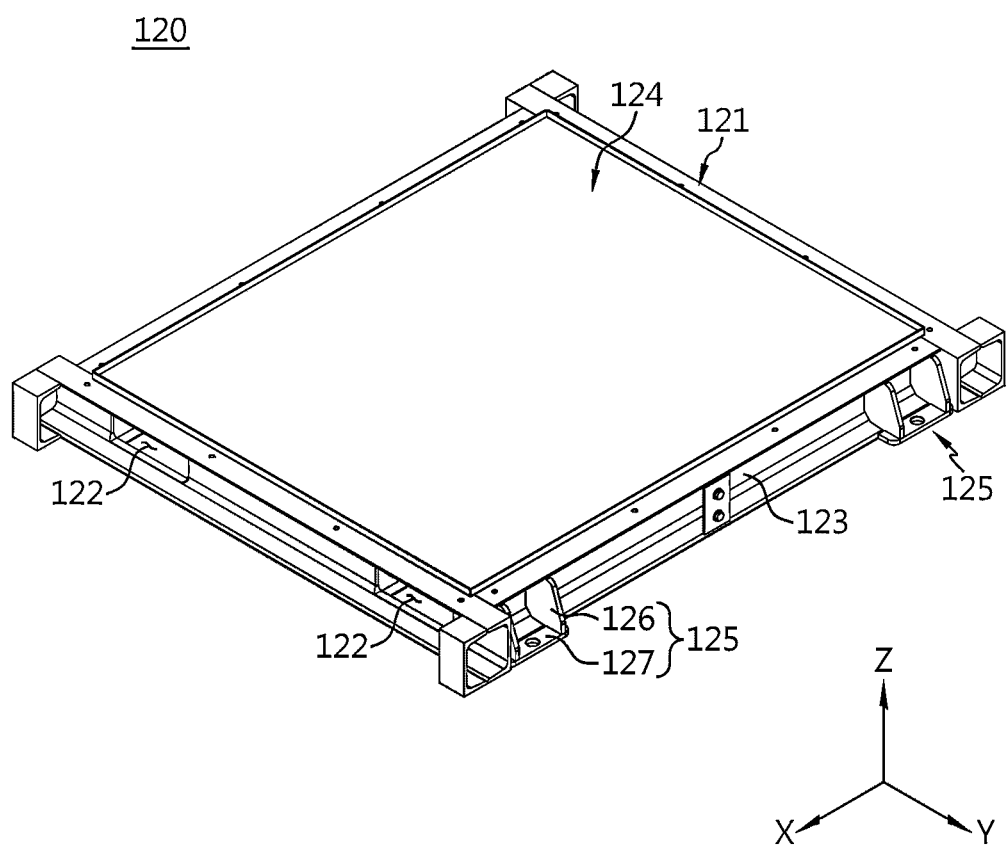
FIG. 3 is a perspective view illustrating a base frame assembly, according to an embodiment of the present disclosure.

Referring to FIG. 3, the base frame assembly 120 may include an outer frame 121 forming a quadrangular edge with four beams and a bottom panel portion 124 covering an inner empty area of the outer frame 121, and may be configured to support an enclosure body 110 from the bottom.

Also, the base frame assembly 120 may be configured to be transportable by a transportation device such as a forklift. The fork lift may refer to a transport vehicle or a transport device including a post erected at the front of the vehicle and a fork that may be lifted along the post.

In detail, the outer frame 121 includes fork insertion holes 122 in two beams that are parallel to each other. The fork insertion holes 122 formed in the two beams may be formed so that side portions of the beams are penetrated in a front-back direction (+X direction). The fork of the fork-lift may be inserted into the fork insertion holes 122, and the water injection unit 10 may be lifted and transported by the fork-lift.

In the water injection unit 10 according to the present disclosure, the gas storage tank 300 may be replaced through the front door 112 of the enclosure 100, and fire extinguishing water of the water tank 200 may be drained or filled through a drain/fill port 132 as a connection port 130 described below. In this case, when the water injection unit 10 is transported, the water injection unit 10 may be transported as light as possible by not placing the gas storage tank 300 in the enclosure 100 and emptying the water tank 200. After the enclosure 100 is installed at a desired location, the gas storage tank 300 may be inserted into the enclosure 100 through the front door 112 of the enclosure 100 and the water tank 200 may be filled with fire extinguishing water.

Also, the base frame assembly 120 includes anchor insertion portions 123 formed in at least two of the four beams of the outer frame 121, and anchor units 125 inserted into the anchor insertion portions 123.

Figure 4:
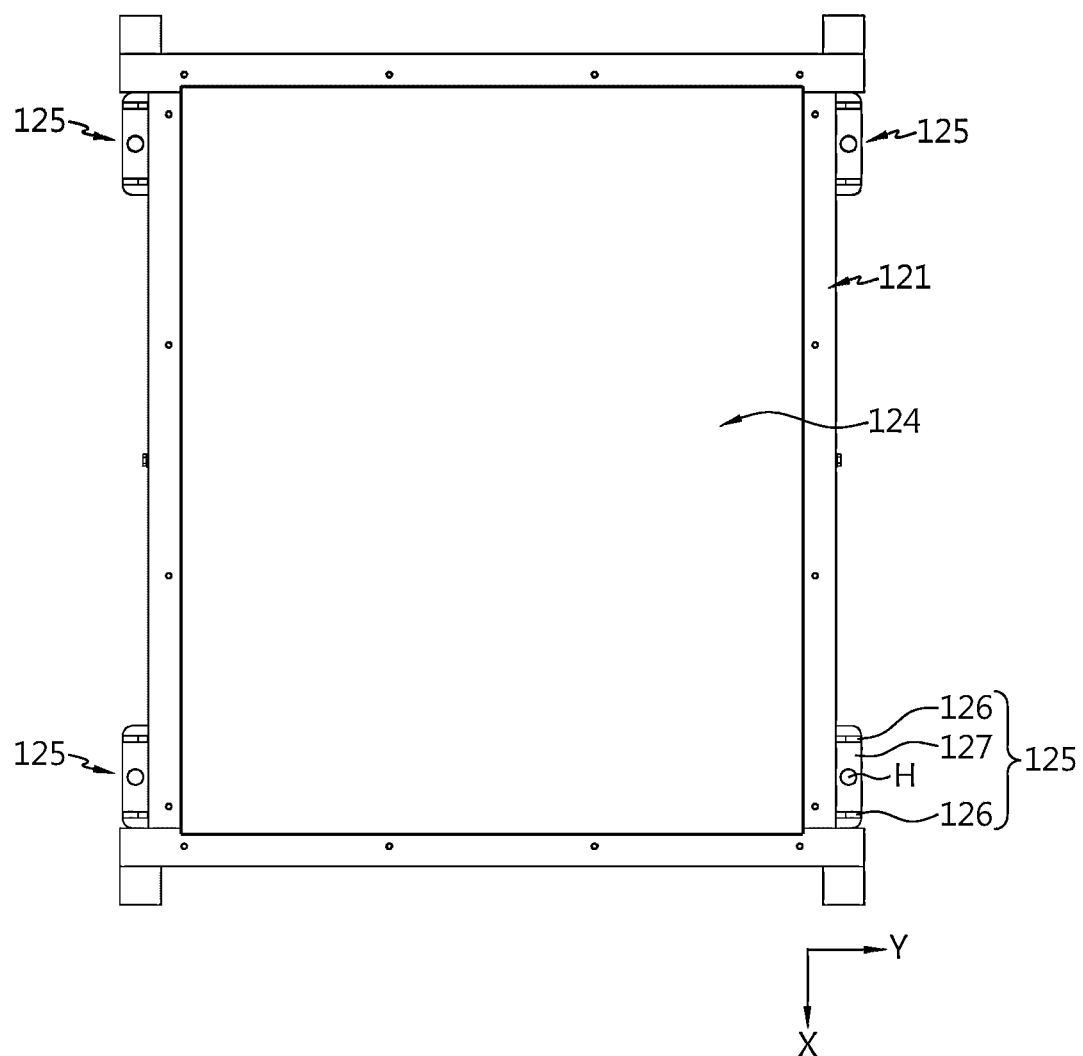
FIG. 4 is a plan view illustrating a base frame assembly, according to an embodiment of the present disclosure.
Figure 5:
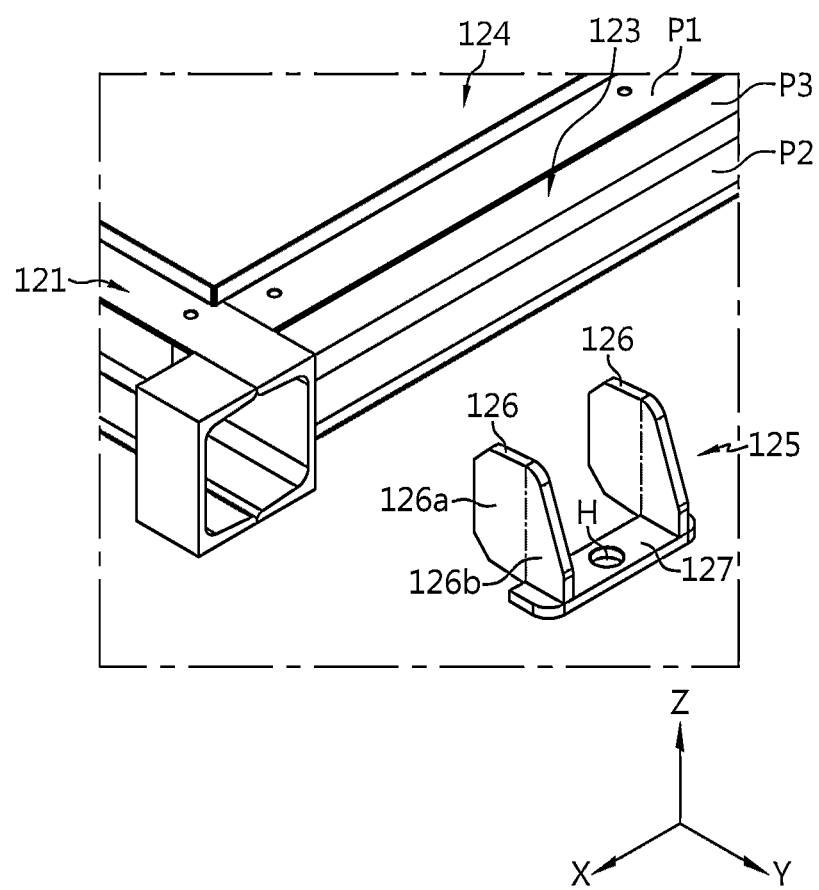
FIG. 5 is a view illustrating an anchor unit separated from an outer frame of FIG. 3.

Referring to FIGS. 3 to 5, in the outer frame 121, the anchor insertion portions 123 may be provided in two beams extending in the X-axis direction and parallel to each other. The anchor insertion portions 123 is formed by causing a side surface of the beam to be recessed inward from an outer side.

In more detail, referring mainly to FIG. 5, the anchor insertion portion 123 includes a first plate P1 and a second plate P2 spaced apart from each other in a height direction (Z direction) of the base frame assembly 120 and facing each other, and a third plate P3 having upper and lower ends perpendicularly connected to the first and second plates P1, P2. The third plate P3 is located in an inner edge portion in a width direction (Y direction) of the first and second plates P1, P2. The anchor insertion portion 123 has an inner space surrounded by the first to third plates P1, P2, P3, which is open in a direction facing the third plate. Accordingly, the anchor unit 125 may be partially inserted into the inner space of the anchor insertion portion 123.

The anchor unit 125 includes a beam support plate 126 including a first part 126a and a second part 126b, and an anchor plate 127 provided at a lower end of the second part 126b.

In the beam support plate 126, the first part 126a may have a height corresponding to a height of the inner space of the anchor insertion portion 123 and may be forcibly fitted (interference fit) into the anchor insertion portion 123. In the beam support plate 126, the second part 126b may further protrude outward from the anchor insertion portion 123.

A pair of beam support plates 126 may be provided, and the two beam support plates 126 may be spaced apart from each other by a certain interval in a horizontal direction. Although one pair of beam support plates 126 are provided in the present embodiment, one, or three or more beam support plates 126 may be provided.

The anchor plate 127 is provided at a lower end of the second part 126b of the beam support plate 126. The anchor plate 127 is formed in a plate shape horizontal to the lower end of the second part 126b to be parallel to the ground. That is, the beam support plate 126 and the anchor plate 127 are provided to cross each other. The anchor plate 127 may include a fastening hole H for fixing the anchor plate 127 to the ground by using, for example, an anchor bolt B.

The anchor units 125 may be inserted into the at least two beams, and may be configured to be fixed to the ground by changing positions along an extending direction of the beams.

Referring back to FIGS. 3 to 5, the inner space of the anchor insertion portion 123 into which the anchor unit 125 may be inserted extends long in the extending direction of the beam. In this case, a range in which the anchor unit 125 may be provided and the number of anchor units 125 that may be provided may be increased.

Figure 6:
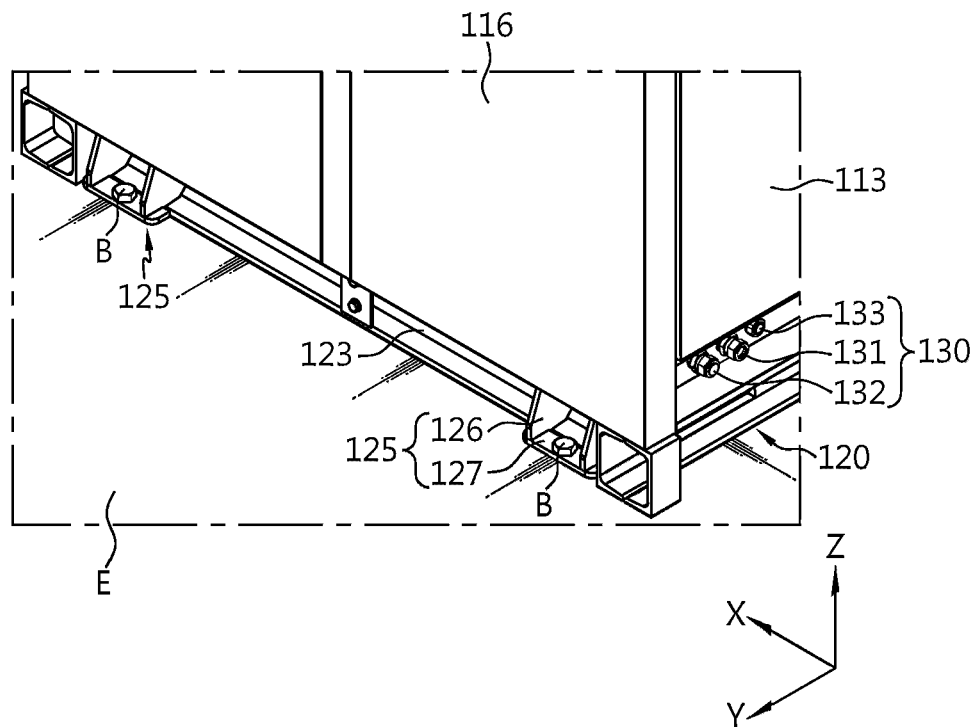
FIG. 6 is a view illustrating an example where a water injection unit is fixed to the ground.
Figure 7:
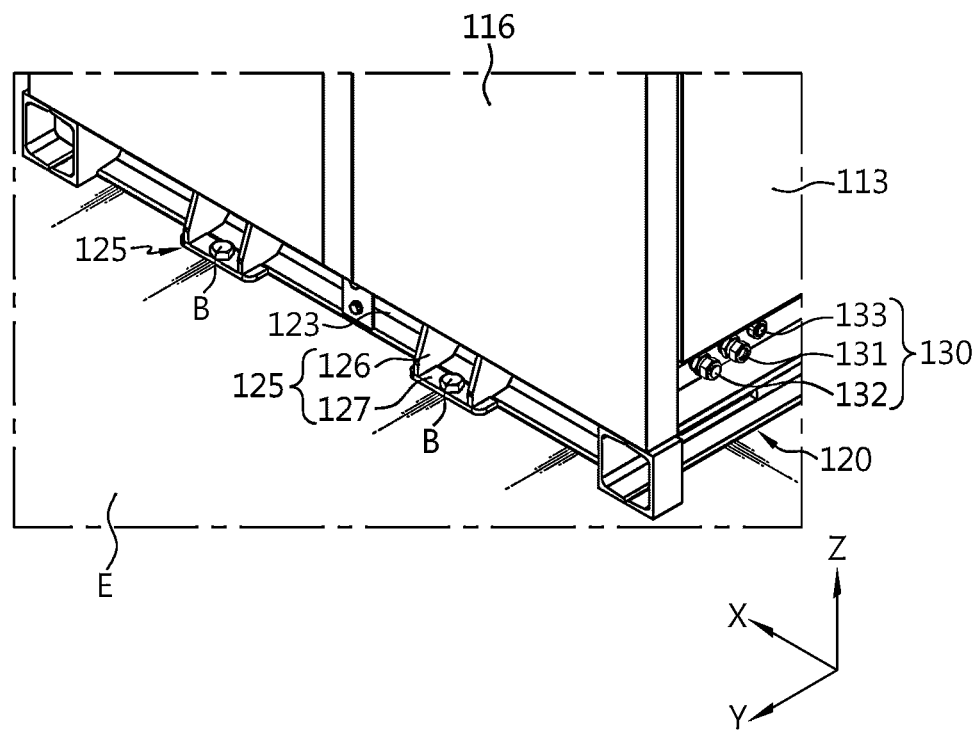
FIG. 7 is a view illustrating an example where a position of the anchor unit of FIG. 6 is changed.

For example, the anchor units 125 may be provided on both edges of the beam of the base frame assembly 120 as shown in FIG. 6, or may be provided at positions spaced apart by a certain interval from one end and the other end of the beam as shown in FIG. 7. Although not shown, three or four anchor units 125 may be provided for each beam.

For example, a drilling operation is performed in advance to make a hole in the ground E on which the water injection unit 10 is to be installed. A position of the hole that is formed in advance and a position of the fastening hole H of the anchor plate 127 may not match due to a drilling operation error. In this case, because the water injection unit 10 according to the present disclosure may simply change an installation position of the anchor unit 125, the positional error between the position of the hole of the ground E and the position of the fastening hole H of the anchor plate 127 may be coped with. Also, the anchor plate 127 may be easily moved to a better location by checking a state of the ground E of the installation location.

As such, because the water injection unit 10 according to the present disclosure includes the anchor unit 125 and the outer frame 121 including the anchor insertion portion 123, on-site installation may be easily performed even outdoors by adjusting a position of the anchor unit 125 according to a state of the ground and inserting the anchor plate 127 into the ground.

Figure 8:
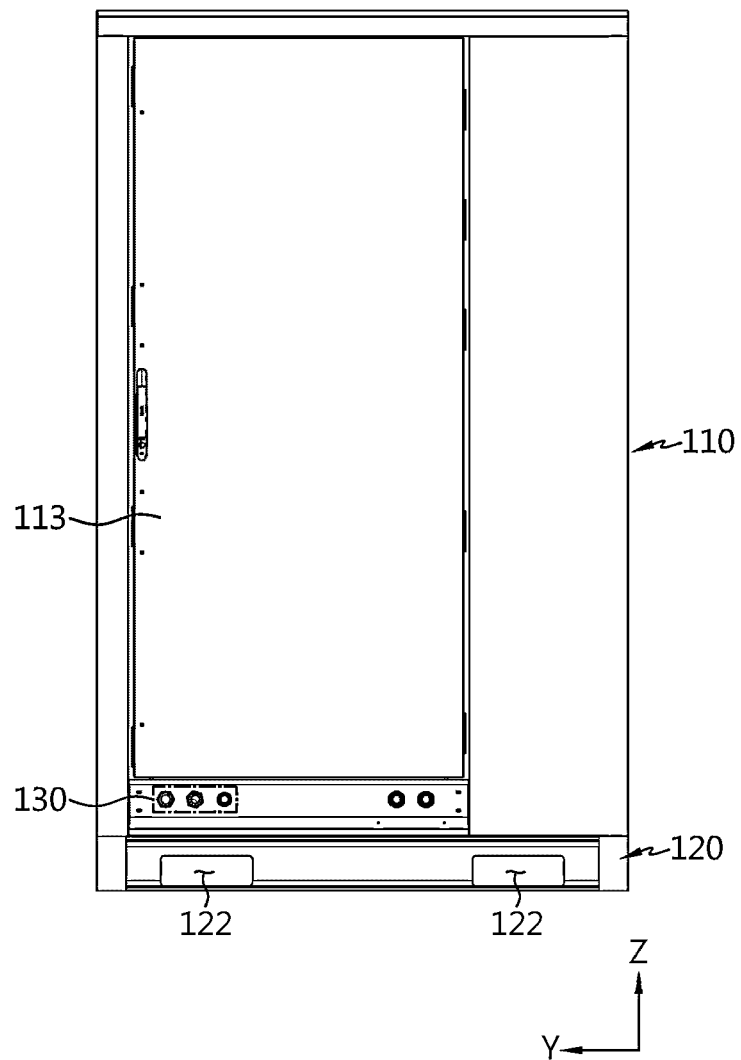
FIG. 8 is a rear view illustrating a water injection unit, according to an embodiment of the present disclosure.
Figure 9:
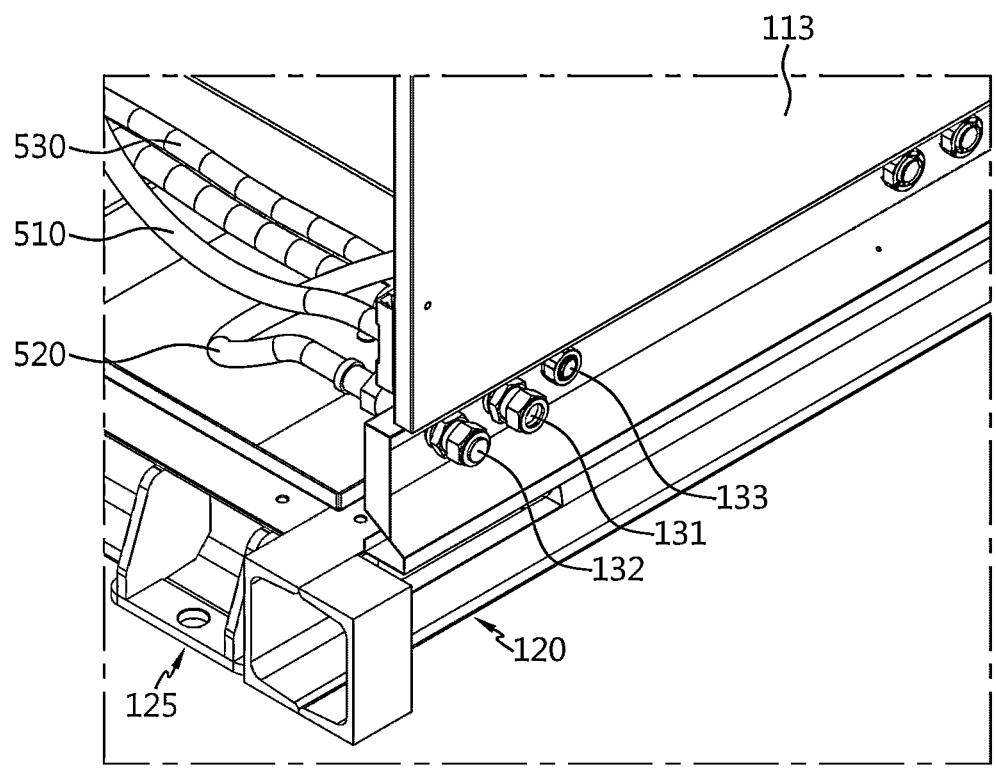
FIG. 9 is an enlarged view illustrating a connection port of a water injection unit, according to an embodiment of the present disclosure.

Referring to FIGS. 8 and 9, the enclosure 100 includes a plurality of connection ports 130.

The connection port 130 may be provided on at least one outer wall of the enclosure 100 to connect a fire-fighting connection hose or a communication/power cable connected from external equipment (e.g., the battery container 20 or an external water source) at the outside of the enclosure 100.

The connection port 130 may include a water injection port 131, the drain/fill port 132, and a communication port 133.

The water injection port 131 and the drain/fill port 132 may be provided under the rear door 113 of the enclosure 100.

The water injection port 131 may be connected to the fire-fighting connection hose at the outside of the enclosure 100, and may be connected to the water tank 200 in the enclosure 100.

The drain/fill port 132 is the connection port 130 for draining fire extinguishing water in the water tank 200 to the outside of the enclosure 100 or filling fire extinguishing water into the water tank 200 from the outside of the enclosure 100. The drain/fill port 132 is connected to the water tank 200 in the enclosure 100. The drain/fill port 132 may be normally closed with a stopper or the like, and may be connected to a drain hose or a fill hose at the outside of the enclosure 100 when necessary.

The communication port 133 may be connected to the communication cable at the outside of the enclosure 100, and may be connected to the controller 400 in the enclosure 100. The communication cable may be connected to a control unit and/or a fire detector provided in the battery container 20.

The water injection port 131, the drain/fill port 132, and the communication port 133 may be provided as one set under the rear door 113. In this case, a wiring layout between the water injection unit 10 and the battery container 20 may be easily simplified.

Referring to FIGS. 10 to 13, the water injection unit 10 according to an embodiment of the present disclosure may further include an external water source port 134. The external water source port 134 may be provided on an outer wall of the enclosure 100 to be connectable to an external water source (e.g., a fire hydrant or a fire engine).

That is, the external water source port 134 is a port where, when there is a fire hydrant around a place where the water injection unit 10 is installed, a fire hose for connecting the fire hydrant to the external water source port 134 is connected to use the fire hydrant instead of the water tank 200. Because the external water source port 134 is provided on the outer wall of the enclosure 100, when a fire occurs, fire extinguishing water of the water tank 200 may be primarily used for the fire, and when a fire engine reaches the scene of the fire, a fire hose of the fire engine may be connected to the external water source port 134 and fire extinguishing water of the fire engine may be directly supplied to the battery container 20.

Figure 12:
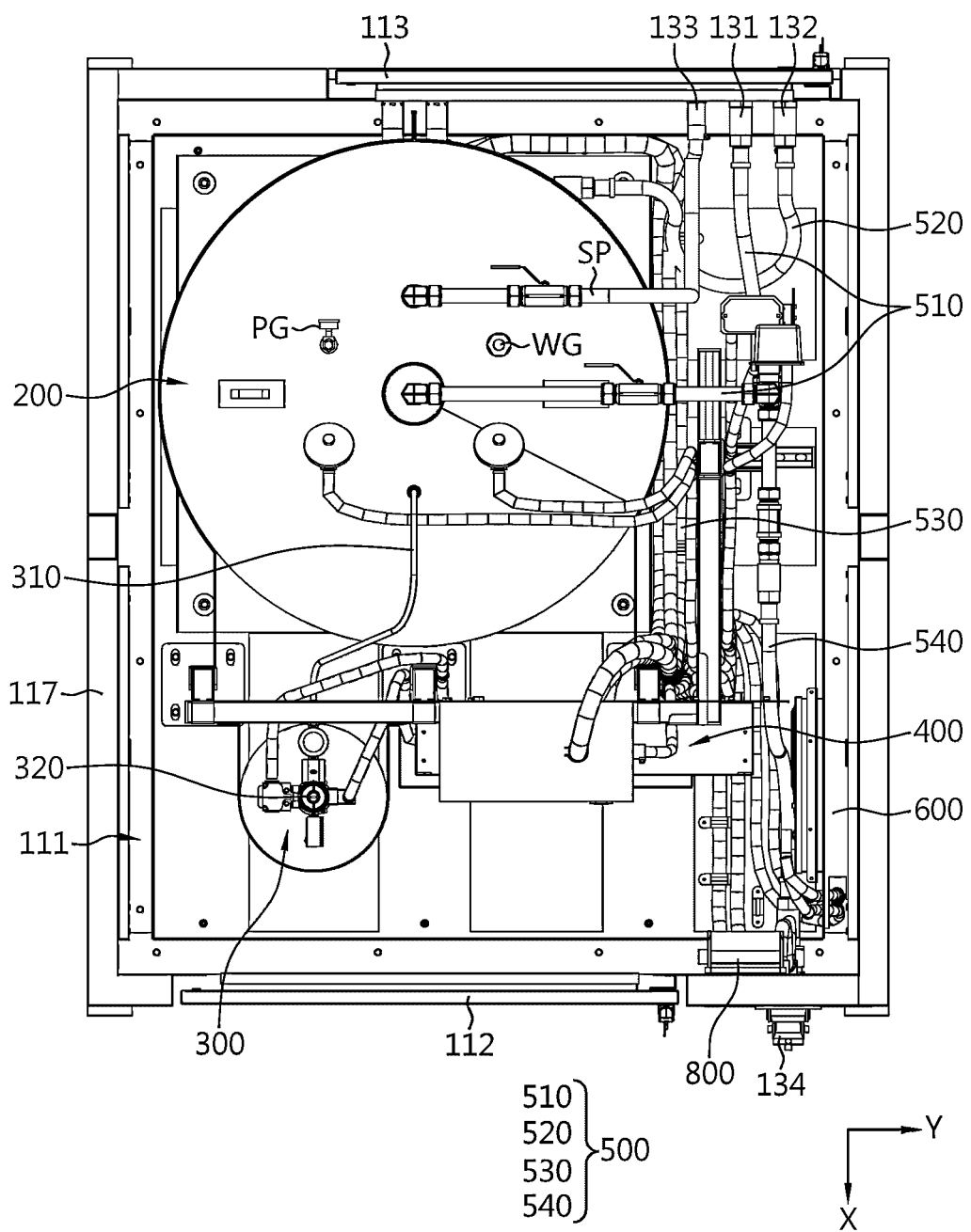
FIG. 12 is a cross-sectional view illustrating a water injection unit, according to an embodiment of the present disclosure.
Figure 13:
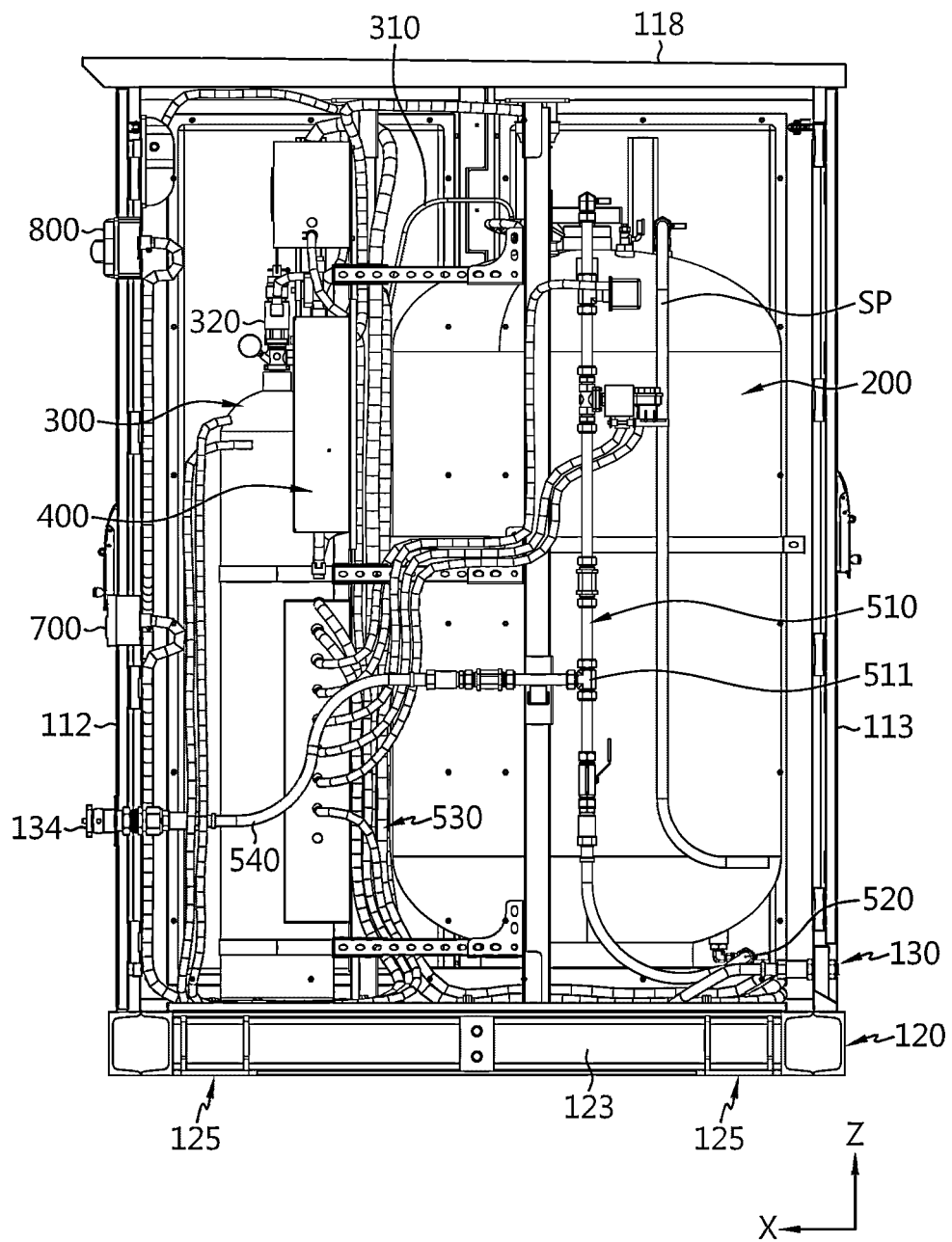
FIG. 13 is a longitudinal sectional view illustrating a water injection unit, according to an embodiment of the present disclosure.

Referring to FIGS. 12 and 13, the water tank 200 is an element in which fire extinguishing water is stored, and for example, a fire extinguishing water storage capacity may be determined according to the size or the number of fire extinguishing means. For example, in the present embodiment, the water tank 200 has a fire extinguishing water storage capacity of about 900 L to about 1000 L to respond to a fire in three battery containers 20.

The water tank 200 is connected to the water injection port 131 through a water injection pipe line 510 in the enclosure 100. Also, the water tank 200 may further include a pressure sensor PG and a water level sensor WG for monitoring internal pressure and a water level. An auxiliary pipe SP and a valve for opening/closing the auxiliary pipe SP may be provided in the water tank 200 to adjust a water level or pressure.

In particular, the water tank 200 may be connected to the gas storage tank 300. As shown in FIG. 12, the water tank 200 and the gas storage tank 300 may be connected by a gas supply pipe 310 through which gas moves.

A valve of the gas storage tank 300 is opened/closed by the controller 400 under certain conditions to supply gas to the water tank 200. When gas is sprayed from the gas storage tank 300 to the water tank 200, fire extinguishing water in the water tank 200 may be rapidly and strongly discharged to the outside of the water tank 200 due to pressure of the gas.

The gas may be nitrogen gas. Accordingly, the gas storage tank 300 may be a nitrogen tank. However, the gas storage tank 300 does not necessarily have to be a nitrogen tank. That is, any gas may be used as long as it may perform a function like nitrogen gas.

The gas storage tank 300 may include a tank body in which gas may be stored, a valve provided on a side of the tank body, and an actuator 320 for closing/opening the valve. The actuator 320 may be connected to the controller 400, and may be configured to operate according to a control signal of the controller 400. The actuator may be any suitable mechanical or electronic actuator.

For example, when the controller 400 detects a fire in the battery container 20, the actuator may be operated by the controller 400 to open the valve of the gas storage tank 300 and spray gas into the water tank 200 through the gas supply pipe 310. Then, fire extinguishing water in the fire extinguishing tank may be rapidly discharged along the water injection pipe line 510 under pressure of the gas.

The controller 400 is an element connected to the connection port 130 and the gas storage tank 300, and configured to detect whether a fire occurs in the battery container 20, and allow gas in the gas storage tank 300 to be sprayed into the water tank 200 and allow fire extinguishing water in the water tank 200 to be discharged due to gas pressure.

That is, the controller 400 may be configured to transmit data to the battery container 20 to determine a fire situation of the battery container 20, and when certain conditions are satisfied, control the gas storage tank 300 to spray gas from the gas storage tank 300. In addition, the controller 400 may be configured to operate a horn/warning light 800 to notify an emergency situation. The controller 400 may selectively include a processor, an application-specific integrated circuit (ASIC), a logic circuit, a register, a communication modem, a data processing unit, and the like known in the art.

Also, the water injection unit 10 according to an embodiment of the present disclosure includes pipe members 500 for connecting the connection port 130, the external water source port 134, and internal components, that is, the water tank 200, the gas storage tank 300, and the controller 400, in the enclosure 100.

Referring to FIGS. 12 and 13, the pipe members 500 include the water injection pipe line 510 for connecting the water tank 200 to the water injection port 131, a drain/fill pipe line 520 for connecting the water tank 200 to the drain/fill port 132, and a communication conduit line 530 for connecting the controller 400 to the communication port 133.

The water injection pipe line 510 may include at least one metal conduit, a flexible hose, a connection flange, and an opening/closing valve. The water injection pipe line 510 extends from an upper end of the water tank 200 to the water injection port 131 located on a rear outer wall of the enclosure 100 and functions as a passage through which fire extinguishing water may move from the water tank 200 to the water injection port 131.

The drain/fill pipe line 520 may include at least one metal conduit, a flexible hose, and an opening/closing valve, may extend from a lower end of the water tank 200 to the drain/fill port 132 located on the rear outer wall of the enclosure 100, and may be used as a movement path of fire extinguishing water when fire extinguishing water is drained from the water tank 200 or is filled in the water tank 200.

The communication conduit line 530 may include a conduit formed of an insulating material and at least one communication cable or power cable inserted into the conduit. The communication conduit line 530 functions as a movement path of data or power required to operate an AC box, the gas storage tank 300, the water tank 200, an air conditioning device 600, a manual operation unit 700, and the horn/warning light 800 as well as between the controller 400 and the communication port 133 in the enclosure 100.

The water injection unit 10 according to the present disclosure further includes an external water source connection line 540 as the pipe member 500 as shown in FIG. 13. The external water source connection line 540 includes a flexible hose and a metal conduit. The external water source connection line 540 that is the pipe member 500 for moving fire extinguishing water introduced into the external water source port 134 to the water injection port 131 connects the external water source port 134 to the water injection pipe line 510. For example, the external water source connection line 540 and the water injection pipe line 510 may be connected by a T flange 511 or a T-type tee. According to this pipe configuration, an external water source such as a water hydrant or a fire engine may be connected to the external water source port 134 provided on an outer wall of the enclosure 100, to draw fire extinguishing water from the external water source and supply the fire extinguishing water to a target object in which a fire occurs, that is, the battery container 20, through the external water source connection line 540, the water injection pipe line, the water injection port 131, and a fire-fighting connection hose connected to the water injection port 131.

In the water injection unit 10 according to the present disclosure, the water tank 200, the gas storage tank 300, the controller 400, and the pipe member 500 are arranged in the enclosure 100 as shown in FIG. 12, for miniaturization, light weight, and convenience of management.

That is, in FIG. 12, the water tank 200 having a largest volume is located at a left corner of the enclosure 100, the gas storage tank 300 and the controller 400 are located to face the front door 112, and most of the pipe members 500 and manual switches for opening/closing the pipe members 500 are located to face the rear door 113.

According to this configuration, most of internal components may be managed and maintained by opening the front door 112 or the rear door 113. For example, the gas storage tank 300 may be replaced or the controller 400 may be managed by opening the front door 112, and the pipe member 500 and the connection port 130 may be managed by opening the rear door 113. As such, because the internal components in the enclosure 100 may be managed and maintained and space intensively arranged, the enclosure 100 may be as small and light as possible.

The water injection unit 10 according to an embodiment of the present disclosure may further include the air conditioning device 600. The air conditioning device 600 is fixedly provided on an outer wall of the enclosure 100 to adjust a temperature and humidity in the enclosure 100. An operation of the air conditioning device 600 may be controlled by the controller 400. For example, when a temperature in the enclosure 100 decreases, the controller 400 activates a heating function of the air conditioning device 600, and when a temperature in the enclosure 100 increases, the controller 400 activates a cooling function of the air conditioning device 600. In this case, even when a temperature outside the enclosure 100 drops below zero, fire extinguishing water in the water tank 200 may be prevented from freezing, and a malfunction of electronic and electrical components may be prevented.

Also, the water injection unit 10 according to an embodiment of the present disclosure may further include the manual operation unit 700 (e.g., a manual pull station (MPS)). The manual operation unit 700 may be provided on an outer wall of the enclosure 100, and may be connected to the gas storage tank 300 in the enclosure 100 to spray gas stored in the gas storage tank 300. For example, the manual operation unit 700 may be provided in the form of a lever. When the lever is pulled, a mechanical or electrical signal may be directly transmitted to the actuator 320 of the gas storage tank 300, or may be transmitted to the actuator of the gas storage tank 300 through the controller 400, so that the valve of the gas storage tank 300 is opened to spray gas. In an emergency situation where a fire detector does not operate, in particular, fire extinguishing water may be rapidly injected by using the manual operation unit 710.

Figure 10:
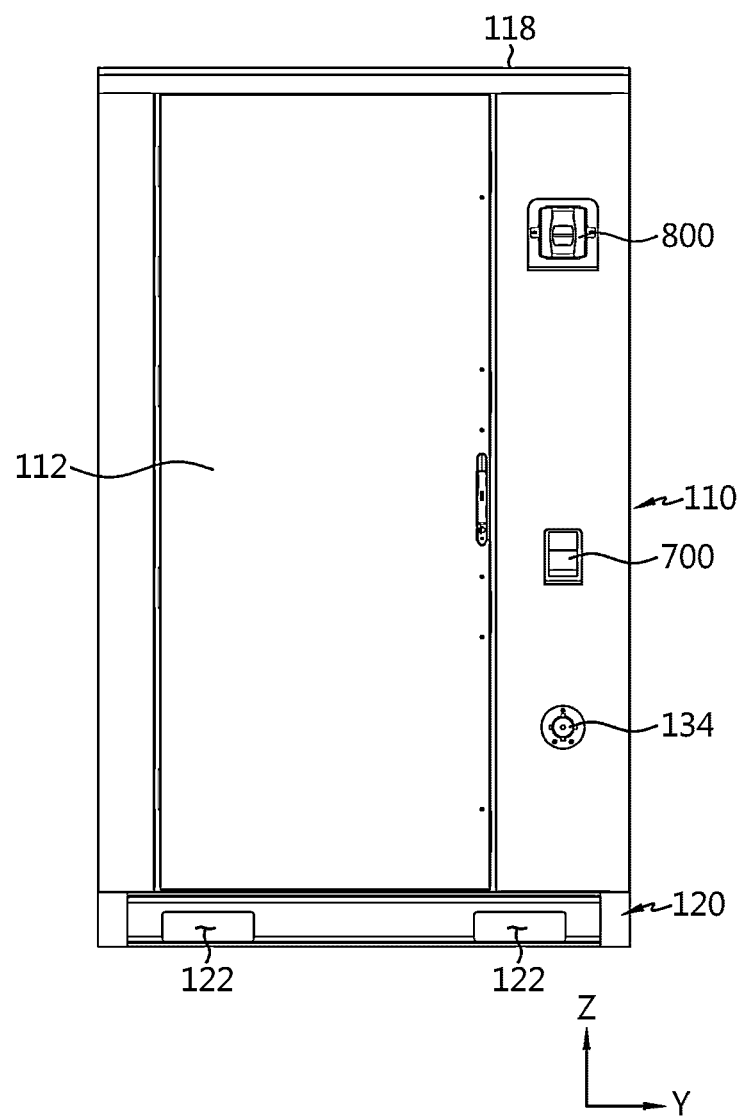
FIG. 10 is a front view illustrating a water injection unit, according to an embodiment of the present disclosure.
Figure 11:
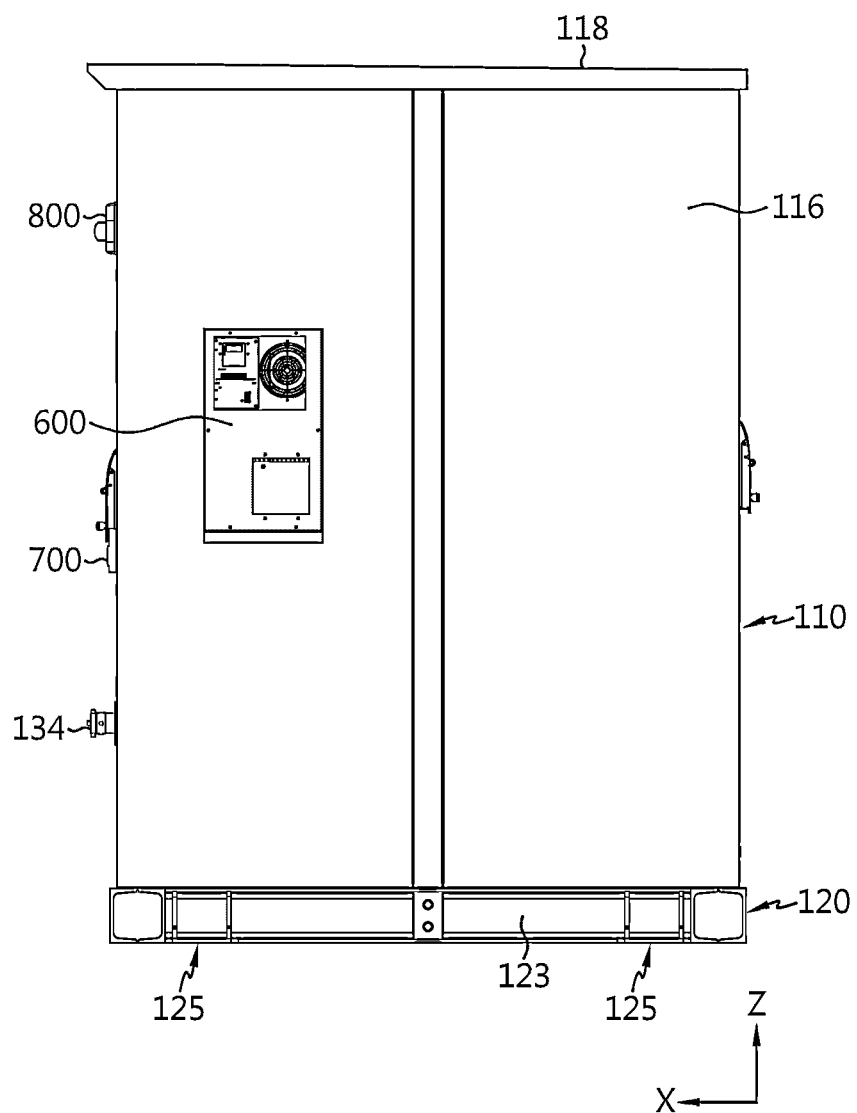
FIG. 11 is a side view illustrating a water injection unit, according to an embodiment of the present disclosure.

Also, the water injection unit 10 according to an embodiment of the present disclosure may include the horn/warning light 800 at an upper end of a front surface of the enclosure 100 as shown in FIGS. 10 and 13, to audibly and visually notify an event situation. The horn/warning light 800 may be connected to the controller 400 and may be configured to emit an alarm sound or light when a fire occurs based on a control signal of the controller 400.

Figure 14:
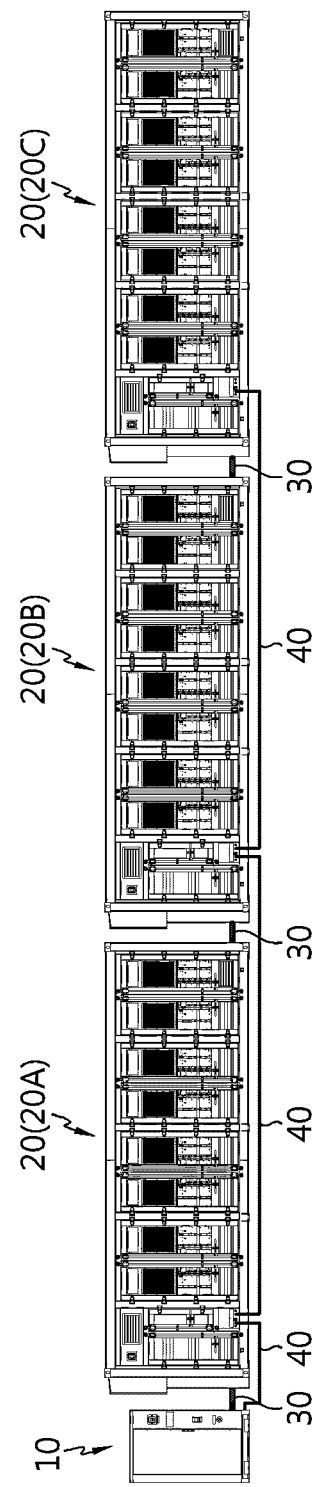
FIG. 14 is a view schematically illustrating a configuration of an energy storage system, according to an embodiment of the present disclosure.
Figure 15:
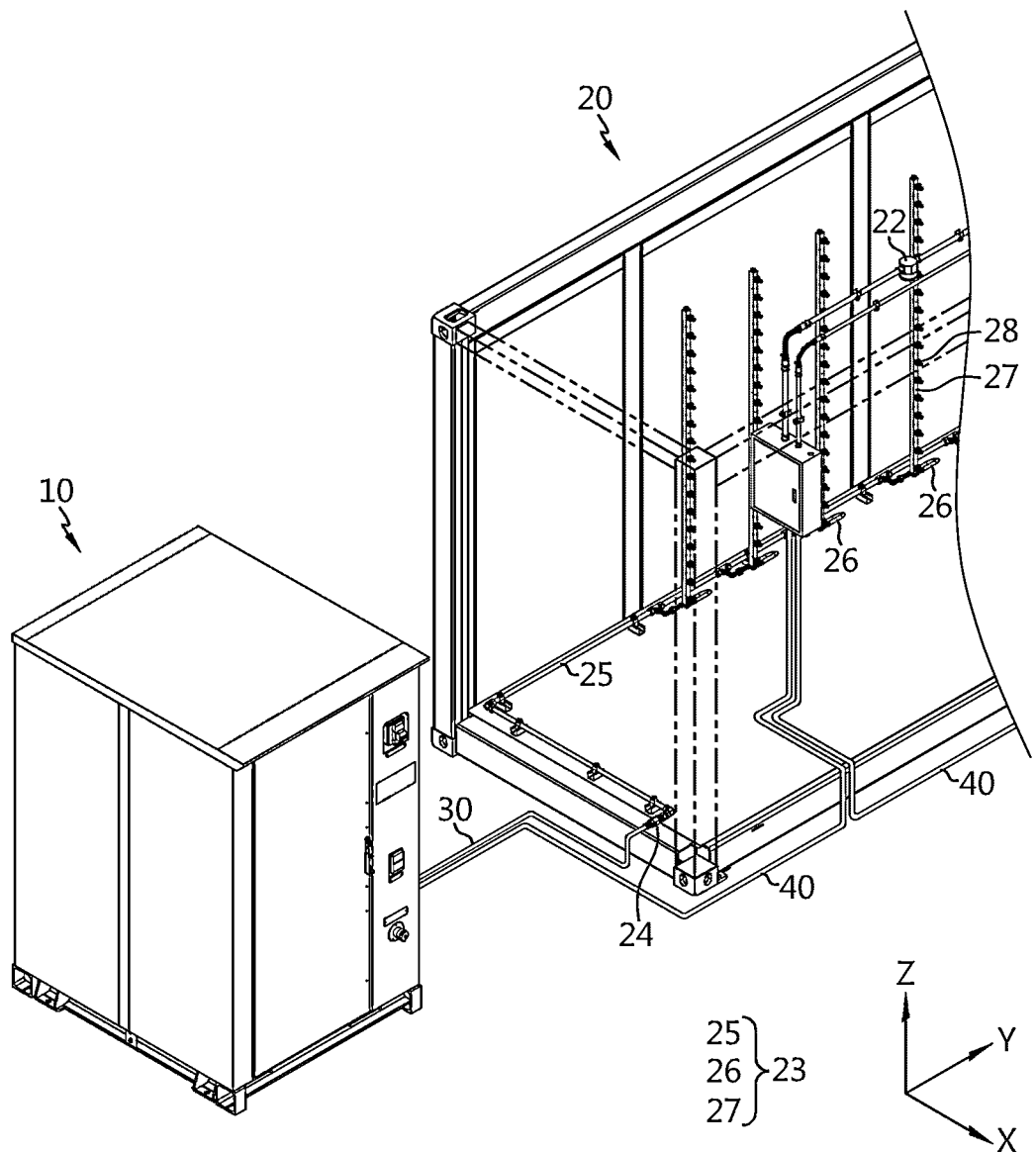
FIG. 15 is a view schematically illustrating some elements of a water injection unit and a battery container, according to an embodiment of the present disclosure.
Figure 16:
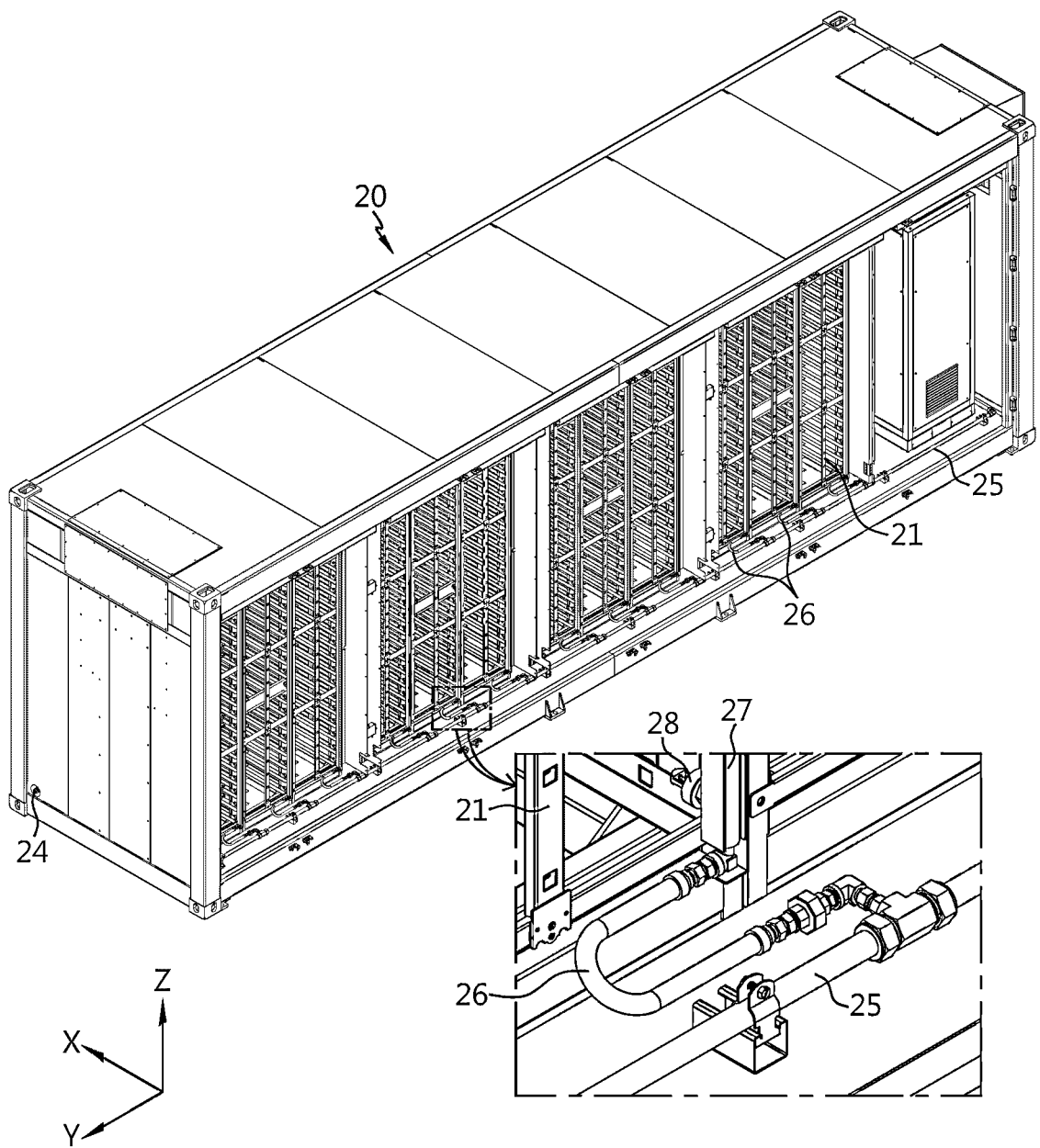
FIG. 16 is a view schematically illustrating battery racks and a fire extinguishing pipe line provided in a battery container, according to an embodiment of the present disclosure.
Figure 17:
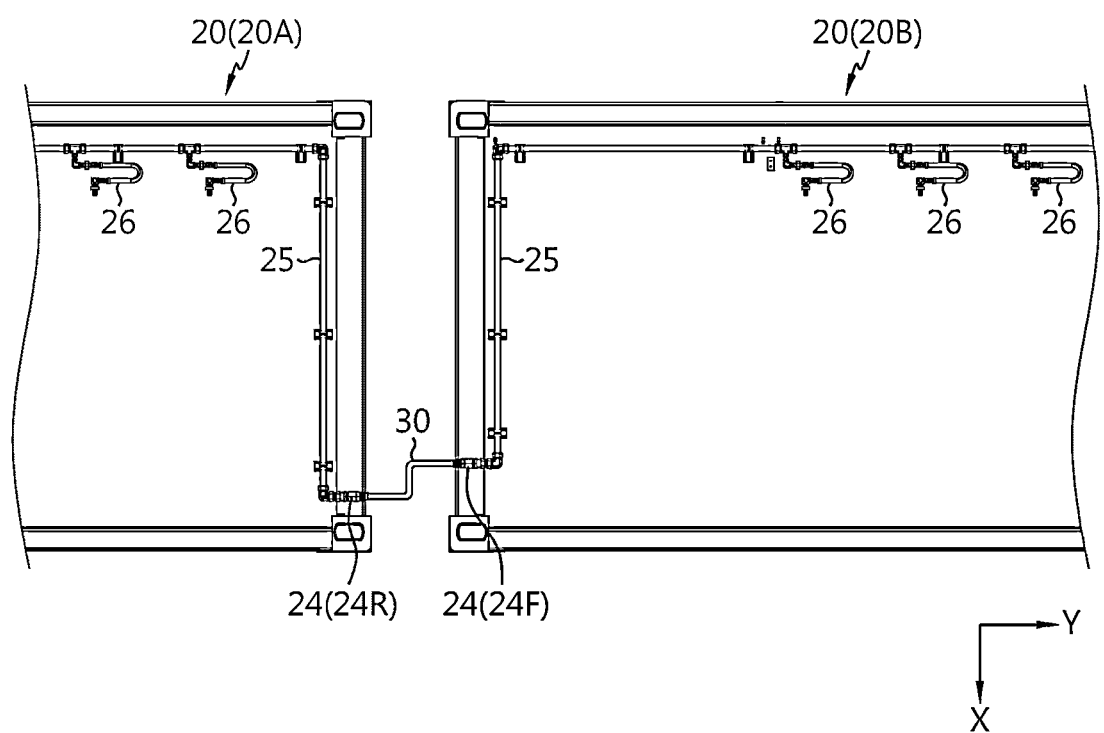
FIG. 17 is a view schematically illustrating a connection type between two battery containers, according to an embodiment of the present disclosure.
Figure 18:
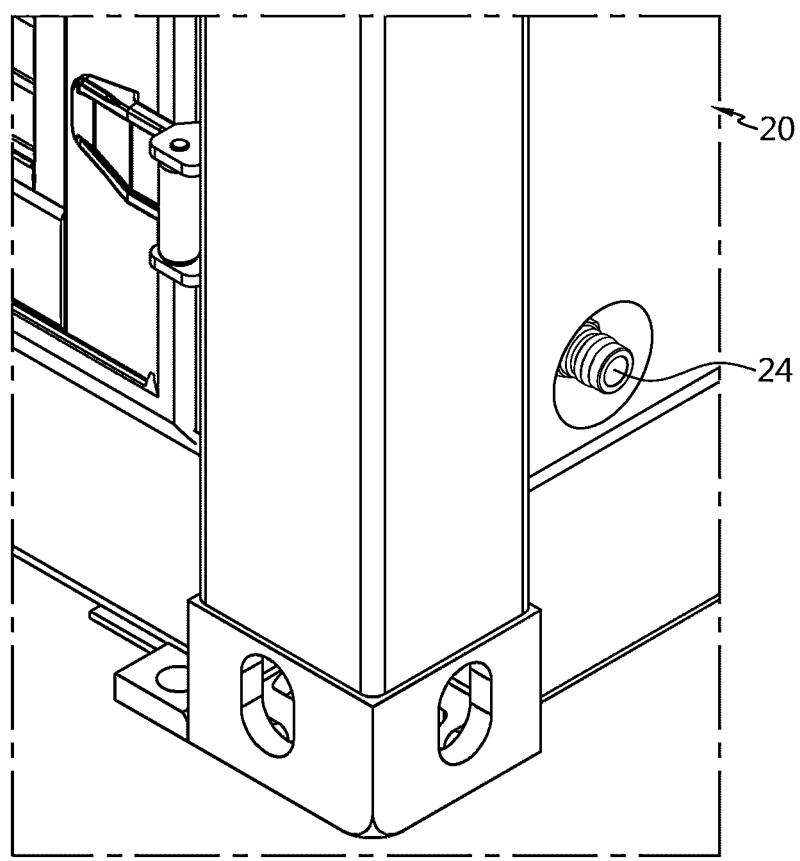
FIG. 18 is an enlarged view illustrating a fire-fighting connector of a battery container, according to an embodiment of the present disclosure.

FIG. 14 is a view schematically illustrating a configuration of an energy storage system, according to an embodiment of the present disclosure. FIG. 15 is a view schematically illustrating some elements of the water injection unit 10 and the battery container 20, according to an embodiment of the present disclosure. FIG. 16 is a view schematically illustrating battery racks 20 and a fire-fighting pipe line 23 provided in the battery container 20, according to an embodiment of the present disclosure. FIG. 17 is a view schematically illustrating a connection type between two battery containers 20, according to an embodiment of the present disclosure. FIG. 18 is an enlarged view illustrating a portion of the battery container 20, according to an embodiment of the present disclosure.

An energy storage system according to the present disclosure will be described with reference to FIGS. 14 to 18.

The energy storage system according to an embodiment of the present disclosure includes the water injection unit 10 and a plurality of battery containers 20A, 20B, 20C as shown in FIG. 14.

The water injection unit 10 has already been described above, and thus, the battery container 20 will be mainly described.

The battery container 20 includes the battery rack 21 and a container housing. The battery rack 21 may have a structure in which a plurality of modules (not shown) are stacked. In each battery module, a plurality of battery cells (secondary batteries) may be accommodated in a module case. Each battery module may be accommodated in a rack case and may be stacked in at least one direction. For example, each battery module may be vertically stacked through the rack case.

A plurality of battery racks 21 may be included in the battery container 20. The plurality of battery racks 21 may be arranged in at least one direction, for example, a horizontal direction. For example, in the battery container 20 according to the present disclosure, eight battery racks 21 may be accommodated in the container housing.

The container housing may have an inner empty space in which the battery rack 21 may be accommodated. For example, the container housing may include a metal material such as steel.

Although not shown for convenience of illustration, the battery containers 20 may be electrically connected to each other through connection between main bus bars of the battery containers 20. For example, each of a left battery container 20 and a right battery container 20 may include a main bus bar. A main bus bar connector located on an upper right portion of the left battery container 20 and a main bus bar connector located on an upper left portion of the right battery container 20 may be connected to each other through a connection bus bar or a connection cable. In this case, the main bus bar of the left battery container 20 and the main bus bar of the right battery container 20 may be electrically connected to each other. Accordingly, the left battery container 20 and the right battery connector 20 may be configured so that charging/discharging power flows therebetween. In this case, battery modules included in the left battery container 20 and battery modules included in the right battery container 20 may be electrically connected to each other in parallel.

According to this embodiment, charging/discharging power connection between the plurality of battery containers 20 may be easily made by connecting only the main bus bar connectors provided in the plurality of battery containers 20. Furthermore, in this embodiment, because the main bus bar connectors located in adjacent portions between the plurality of battery containers 20 need to be connected to each other, the connection may be easily achieved.

Referring to FIGS. 15 to 18, the battery container 20 according to the present disclosure may be configured to receive fire extinguishing water from the water injection unit 10.

For example, referring to FIG. 15, the battery container 20 may include a fire detector 22, the fire-fighting pipe line, and a fire-fighting connector 24. The fire detector 22 includes a gas sensor and/or a temperature sensor, and is configured to detect, when gas or flame is generated in the battery module, the gas or flame. The fire detector 22 and the water injection unit 10 are connected through the communication cable 40 or wirelessly, and operation information of the fire detector 22 is transmitted to the controller 400 of the water injection unit 10. Then, gas of the gas storage tank 300 may be sprayed by the controller 400, and fire extinguishing water in the water tank 200 may be rapidly supplied to the battery container 20 due to pressure of the sprayed gas.

As shown in FIGS. 15 and 16, the fire-fighting connector 24 may be connected to the water injection port 131 of the water injection unit 10 through a fire-fighting connection hose 30, and thus, the battery container 20 may receive fire extinguishing water from the water injection unit 10. The fire extinguishing water supplied to the battery container 20 may be supplied to the battery rack 21 in the container housing.

In detail, the battery container 20 may include the fire-fighting pipe line 23 connected to the fire-fighting connector 24 so that fire extinguishing water flows through a specific path in the container housing. The fire-fighting pipe line 23 may include a main pipe 25, a plurality of branch pipes 26, and a rack pipe 27.

The main pipe 25 may have one end connected to the fire-fighting connector 24 provided one side wall surface of the battery container in the battery container 20 and extending in an arrangement direction of the battery racks 21, and the other end connected to the fire-fighting connector 24 provided on the other side wall surface of the battery container 20. The fire-fighting connector 24 provided on the one side wall surface of the battery container 20 is referred to as a first fire-fighting connector 24F, and the fire-fighting connector 24 provided on the other side wall surface of the battery container 20 is referred to as a second fire-fighting connector 24R.

The branch pipe 26 may branch from the main pipe 25 and may be connected to the rack pipe 27. The rack pipe 27 may include injection nozzles 28 respectively connected to battery modules (not shown) provided in the battery rack 21, may be connected to each branch pipe 26, and may be fixedly provided on the battery rack 21. The injection nozzle 28 may be a glass bulb. In this case, when a fire occurs in a specific battery module, a glass bulb connected to the specific battery module may be damaged, and thus, fire extinguishing water may be supplied into the specific battery module.

Also, the energy storage system according to the present disclosure may be configured to supply fire extinguishing water to the plurality of battery containers 20 by using one water injection unit 10. For example, referring to FIG. 17, the fire-fighting connector 24 of any one battery container 20 and the fire-fighting connector 24 of another battery container 20 may be connected through the fire-fighting connection hose 30. Accordingly, the main pipes 25 of the two battery containers 20A, 20B may be connected to each other.

In more detail, referring to FIGS. 14 to 18 together, fire extinguishing water may be supplied from the water injection unit 10 to the first fire-fighting connector 24F of the first battery container 20. The fire extinguishing water may be supplied to the first fire-fighting connector 24F of the second battery container 20B through the main pipe 25 and the second fire-fighting connector 24R of the first battery container 20A, and the fire-fighting connection hose 30. Then, the fire extinguishing water may be supplied from the first fire-fighting connector 24F of the second battery container 20B to the main pipe 25 of the second battery container 20B. Because the second fire-fighting connector 24R of the second battery container 20B and the first fire-fighting connector 24F of the third battery container 20C are also connected through the fire-fighting connection hose 30, the fire extinguishing water may move from the main pipe 25 of the second battery container 20B to the main pipe 25 of the third battery container 20C. Accordingly, the fire extinguishing water supplied from the water injection unit 10 may flow through all of the fire-fighting pipe lines 23 of the three battery containers 20A, 20B, 20C.

According to this simple configuration of the energy storage system according to the present disclosure, a fire of several battery containers 20 may be coped with by using only one water injection unit 10. Accordingly, the safety of the plurality of battery containers 20 against a fire may be improved and installation convenience for a safety improvement structure may also be improved.

The present disclosure has been described with reference to exemplary embodiments. Also, the above description is intended to illustrate and describe preferred embodiments, and the present disclosure may be used in various other combinations, modifications, and environments. That is, changes or modifications may be made within the scope of the present disclosure, within the scope equivalent to the present disclosure, or within the scope of skill or knowledge in the art. Accordingly, the detailed description of the present disclosure is not intended to limit the present disclosure to the above embodiments. Also, the appended claims should be construed as covering other embodiments as well.

What is claimed is:

1. A water injection unit comprising:
   an enclosure comprising a first side wall having a connection port connectable to a fire-fighting connection hose;
   a water tank connected to the connection port and located in the enclosure;
   a gas storage tank connected to the water tank to supply gas into the water tank; and
   a controller connected to the connection port and the gas storage tank, and configured to detect whether a fire occurs in a battery container, cause gas in the gas storage tank to enter into the water tank, and allow a fire extinguishing agent in the water tank to be discharged due to gas pressure,
   wherein the connection port is provided at a lower end of the first side wall of the enclosure, and comprises:
      an injection port connected to the fire-fighting connection hose configured to be connected to the battery container;
      a drain/fill port for filling or draining the fire extinguishing agent in or from the water tank; and
      a communication port for connecting a communication cable to the controller.

2. The water injection unit according to claim 1, wherein the enclosure comprises:
   an enclosure body forming a side portion and a ceiling portion; and
   a base frame assembly located under the enclosure body and supporting the enclosure body, and configured to be transportable by an industrial truck.

3. The water injection unit according to claim 1, wherein the gas storage tank contains nitrogen.

4. The water injection unit according to claim 1, further comprising a pipe member provided in the enclosure, wherein the pipe member comprises:
   a water injection pipe line for connecting the water tank to the injection port;
   a drain/fill pipe line for connecting the water tank to the drain/fill port; and
   a communication conduit line for connecting the controller to the communication port.

5. The water injection unit according to claim 4, wherein the enclosure further comprises an external water source port provided on an outer wall configured to be connectable to an external water source, and
   wherein the pipe member further comprises an external water source connection line for connecting the external water source port to the water injection pipe line.

6. The water injection unit according to claim 1, further comprising an air conditioning device fixedly provided on an outer wall of the enclosure to adjust a temperature and humidity in the enclosure.

7. The water injection unit according to claim 1, further comprising a manual operation unit provided on an outer wall of the enclosure and connected to the gas storage tank to release gas stored in the gas storage tank.

8. The water injection unit according to claim 1, further comprising a horn or a warning light provided on an outer wall of the enclosure, connected to the controller, and configured to emit an alarm sound or light in an event situation.

9. A water injection unit comprising:
   an enclosure comprising a first side wall having a connection port connectable to a fire-fighting connection hose;
   a water tank connected to the connection port and located in the enclosure;
   a gas storage tank connected to the water tank to supply gas into the water tank; and
   a controller connected to the connection port and the gas storage tank, and configured to detect whether a fire occurs in a battery container, cause gas in the gas storage tank to enter into the water tank, and allow a fire extinguishing agent in the water tank to be discharged due to gas pressure,
   wherein the enclosure comprises:
      an enclosure body forming a side portion and a ceiling portion; and
      a base frame assembly located under the enclosure body and supporting the enclosure body, and configured to be transportable by an industrial truck,
   wherein the base frame assembly comprises:
      an outer frame forming a quadrangular edge with four beams; and
      a bottom panel portion covering an inner area of the quadrangular edge of the outer frame, and
   wherein the outer frame comprises insertion holes in two beams that are parallel to each other.

10. The water injection unit according to claim 9, wherein the base frame assembly comprises:
   an outer frame forming a quadrangular edge with four beams extending in a first direction;
   a bottom panel portion covering an inner empty area of the outer frame; and
   anchors inserted into each of the four beams, and configured to change positions along the first direction.

11. The water injection unit according to claim 10, wherein each of at least two of the four beams comprises an anchor insertion portion formed by a recessed side surface, wherein each anchor is inserted into the anchor insertion portion, and comprises:
a beam support plate comprising a first part having a height corresponding to a height of an inner space of the anchor insertion portion and having an interference fit with the anchor insertion portion; and
a second part protruding outward from the anchor insertion portion; and
an anchor plate provided at a lower end of the second part.

12. An energy storage system comprising:
the water injection unit according to claim 1; and
a plurality of battery containers, each battery container comprising:
a battery rack;
a fire detector; and
a fire-fighting pipe line,
wherein the water injection unit and the plurality of battery containers are connected by a fire-fighting connection hose.

13. An energy storage system comprising:
an enclosure comprising a first side wall having a connection port connectable to a fire-fighting connection hose;
a water tank connected to the connection port and located in the enclosure;
a gas storage tank connected to the water tank to supply gas into the water tank;
a controller connected to the connection port and the gas storage tank, and configured to detect whether a fire occurs in a battery container, cause gas in the gas storage tank to enter into the water tank, and allow a fire extinguishing agent in the water tank to be discharged due to gas pressure; and
a plurality of battery containers, each battery container comprising:
a battery rack;
a fire detector; and
a fire-fighting pipe line,
wherein the water injection unit and the plurality of battery containers are connected by a fire-fighting connection hose,
wherein each battery container further comprises a fire-fighting connector provided on an outer wall surface and connected to the fire-fighting pipe line, and
wherein the fire-fighting connector of a first battery container of the plurality of battery containers and the fire-fighting connector of a second battery container of the plurality of battery containers are connected by the fire-fighting connection hose.

14. The energy storage system according to claim 13, wherein the fire-fighting connector comprises a first fire-fighting connector provided on the first battery container, and a second fire-fighting connector provided on the second battery container,
wherein the fire-fighting pipe line comprises:
a main pipe having a first end connected to the first fire-fighting connector and a second end connected to the second fire-fighting connector;
a plurality of branch pipes branching from the main pipe; and
a rack pipe connected to each of the plurality of branch pipes and fixedly provided on the battery rack,
wherein the rack pipe comprises injection nozzles respectively connected to battery modules provided in the battery rack.

15. The water injection unit according to claim 10, wherein each of at least two of the four beams comprises a U-shaped channel, and
wherein each anchor is inserted into the U-shaped channel and can be fixed at any point along the U-shaped channel.

16. The water injection unit according to claim 15, wherein each anchor comprises:
a beam support plate comprising a first part having a height corresponding to a height of the U-shaped channel;
a second part protruding outward from the U-shaped channel; and
an anchor plate provided at a lower end of the second part.

17. A water injection unit comprising:
an enclosure comprising:
an enclosure body forming a side portion and a ceiling portion;
a first side wall having a connection port connectable to a fire-fighting connection hose; and
a base frame assembly located under the enclosure body and supporting the enclosure body;
a water tank connected to the connection port and located in the enclosure;
a nitrogen storage tank connected to the water tank to supply nitrogen gas into the water tank; and
a controller connected to the connection port and the nitrogen storage tank, and configured to detect whether a fire occurs in a battery container, cause nitrogen gas in the nitrogen storage tank to enter into the water tank, and allow a fire extinguishing agent in the water tank to be discharged due to nitrogen gas pressure,
wherein the connection port is provided at a lower end of the first side wall of the enclosure, the connection port comprising:
an injection port connected to the fire-fighting connection hose configured to be connected to the battery container;
a drain/fill port for filling or draining the fire extinguishing agent in or from the water tank; and
a communication port for connecting a communication cable to the controller.

18. The water injection unit according to claim 17, further comprising a pipe member provided in the enclosure, wherein the pipe member comprises:
a water injection pipe line for connecting the water tank to the injection port;
a drain/fill pipe line for connecting the water tank to the drain/fill port; and
a communication conduit line for connecting the controller to the communication port.

* * * * *